Patented June 6, 1939

2,160,937

UNITED STATES PATENT OFFICE 2,160,937

POLYMERIZING VINYLIDENE CHLORIDE

John H. Reilly, Midland, Mich., assignor to The Dow Chemical Company, Midland, Mich., a corporation of Michigan No Drawing. Application September 18, 1937, Serial No. 164,521

4 Claims. (Cl. 18—57)

This invention relates to the polymerization of vinylidene chloride, especially to a process whereby the polymer may be obtained directly in a form suitable for use in casting films and the like.

When vinylidene chloride alone is subjected to polymerizing conditions, i. e. to the action of light, elevated temperatures, and/or catalysts, the polymeric product is ordinarily obtained as a rubbery or bone-like material. In order to cast films from such a polymer, two processes have heretofore been employed, each of which is characterized by certain disadvantages. One process consists in heating the polymeric product to a temperature considerably above its softening point, pouring the material onto a plane surface, and allowing it to set in the form of a sheet or film. Such procedure requires the incorporation in the polymer of heat stabilizing agents to minimize the thermal decomposition thereof when subjected to elevated temperatures, and normally results in discolored films having only moderate tensile strength. The other process heretofore employed comprises heating the polymerized material in the presence of a dispersion medium therefor to produce a solution or colloidal dispersion, and thereafter pouring a layer of the dispersion onto a plane surface and evaporating the solvent medium. This latter procedure is limited in its application, because vinylidene chloride polymers are only slightly soluble in most organic solvents except at elevated temperatures, and even then they dissolve or suspend slowly. The time and temperatures required to prepare a dispersion from which films can be cast is such that the polymeric material is partially decomposed or discolored during the film casting operation. The films so produced are not entirely satisfactory, in that they have low tensile strength, and without certain supplementary operations they are not sufficiently tough to be useful.

It is, accordingly, an object of the present invention to provide a polymerization process whereby a polymer of vinylidene chloride may be produced directly in a form suitable for film casting operations and the like, and which will yield light colored, strong films.

I have now found that the foregoing and other objects can be attained by carrying out the polymerization of vinylidene chloride in the presence of at least an equal weight of a non-polymerizable inert liquid which is immiscible with water but miscible with monomeric vinylidene chloride, examples of which are orthodichlorobenzene, trichlorobenzene, beta-beta'-dichloro-diethyl ether, acetylene tetrachloride, pentachloroethane, and the like. Polymerization in the presence of at least an equal weight of such inert liquid results in the formation of a gel when polymerization is nearly complete, consisting of polymeric vinylidene chloride and the inert liquid, which gel has ordinarily a melting or liquefying point at, or very near, 143–145° C. It is therefore desirable to employ those inert liquids which have boiling points above about 145° C., but which are readily volatile below the decomposition temperature of vinylidene chloride polymers, i. e. below about 220° C.

In a preferred method of carrying out the present invention, substantially pure monomeric vinylidene chloride is diluted with from 1 to 2 parts by weight of orthodichlorobenzene per part of monomeric vinylidene chloride. The mixture is covered with a layer of water, which acts as a sealing agent to exclude air, and is allowed to stand, with or without agitation, at a temperature between room temperature and about 90° C. until polymerization is substantially complete, i. e. for a period ranging from a few hours to a week or more. When the mixture is agitated, the polymerization progresses more rapidly. The water or other covering liquid is decanted from the mixture, which is then found to be in the form of a gel. The gel is heated to the liquefaction temperature, i. e. to about 145° C., and is poured out onto a plane surface, suitably in a film casting device, and is thereafter freed from remaining solvent. The orthodichlorobenzene can be removed from the film either by blowing a stream of warm air thereover while keeping the temperature of the film at or near 130–145° C., or by washing the film after part of the inert liquid has been evaporated therefrom, with a liquid such as ether, alcohol, acetone, etc., which is miscible with orthodichlorobenzene but not a solvent for polymeric vinylidene chloride.

When relatively thick sheets of polymeric vinylidene chloride are formed from a gel of the type described above, these sheets may be freed from traces of solvent remaining after partial evaporation thereof by pressing them between filter cloths or other absorptive materials. It is not ordinarily desirable to heat the films or sheets produced by my process to a temperature above the boiling point of the solvent employed, as this may result in gradual decomposition and discoloration of the polymeric product. Sheets of vinylidene chloride polymer produced by the present method may be rolled or molded to uniform thickness even at temperatures as low as 30° to 50° C., but if the operation is carried out at a temperature around 145° C., the strength of the sheet is materially improved.

The following example is illustrative of the practice of my invention, but is not to be construed as limiting the same.

*Example*

800 cc. (approximately 1000 grams) of a mixture consisting of 40 per cent by weight of vinylidene chloride and 60 per cent by weight of orthodichlorobenzene was covered with a layer of water and allowed to stand for about five days at a temperature of approximately 30° C. The water was removed by decantation and the material remaining in the reaction vessel was found to be a gel-like mass which readily liquefied at a temperature of about 143° C. Sheets and films of vinylidene chloride polymer produced from this gel were readily freed from solvent by washing with acetone and were found to be light colored and very tough. When a sample of the same batch of monomeric vinylidene chloride, which was employed in this experiment, was subjected to polymerizing conditions in the absence of a dispersion medium such as orthodichlorobenzene, and was subsequently heated with orthodichlorobenzene to form a dispersion therein, and cast in the form of films, the fabricated articles were dark colored and relatively weak.

The amount of orthodichlorobenzene or similar liquid employed may be varied, but to accomplish the best results, I have found that the mixture subjected to polymerization should consist of from 15 to 50 parts by weight of monomeric vinylidene chloride, and from 50 to 85 parts of orthodichlorobenzene or its equivalent. When lesser amounts of the inert dispersion medium are employed, the polymer is not produced in the form of a satisfactory gel. For example, when less than 30 per cent of orthodichlorobenzene is employed, based on the weight of the mixture, the polymer is produced in the form of an amorphous powder. This latter is also a useful procedure for some purposes, as is set forth more fully in a co-pending application of the present inventor and another, Serial Number 164,520, filed September 18, 1937.

Other inert liquids than orthodichlorobenzene may be employed in a manner similar to that given in the example, and with comparable results. These are generally non-polymerizable water-immiscible liquids, inert to the action of vinylidene chloride, and having boiling points preferably above about 145° C., but with sufficient vapor pressure at that temperature to be readily removed from the polymer by vaporization when it is spread out in the form of a film or sheet. For example, when 500 grams of a mixture composed of equal parts, by weight, of vinylidene chloride and acetylene tetrachloride was heated to about 40–50° C. for about 4 days, polymerization of the vinylidene chloride was substantially complete, and the reaction mass was a gel-like mass which liquefied at about 143° C. When films of vinylidene chloride were cast therefrom at temperatures between about 130° and 145° C., the acetylene tetrachloride readily evaporated from the film, which was of uniform consistency, and, when cooled, quite tough.

If desired, the polymerization rate of vinylidene chloride liquids of the type defined may be increased by elevating the reaction temperature or by incorporating in the mixture to be polymerized a small amount of catalyst such as, for example, phosphorus pentachloride, benzoyl peroxide, or mixtures of benzoyl peroxide with tetraethyl lead and a poly-halo oxygen-containing organic compound such as hexachloro-diphenyloxide. Heat stabilizing agents, coloring agents, plasticizers, and the like, which are not inhibitors of the polymerization of vinylidene chloride in the presence of a liquid of the type mentioned, may be incorporated in the mixture prior to polymerization, if desired.

Other modes of applying the principle of my invention may be employed instead of the one explained, change being made as regards the steps and ingredients herein disclosed, provided the steps or ingredients stated by any of the following claims, or the equivalent thereof, be employed.

I therefore particularly point out and distinctly claim as my invention:

1. The process which comprises subjecting monomeric vinylidene chloride to polymerization at a temperature between about room temperature and about 90° C. in the presence of at least an equal weight of a non-polymerizable, water-immiscible, inert liquid, whereby there is produced a gel having a liquefaction temperature of about 143° to 145° C., said non-polymerizable liquid being miscible with monomeric vinylidene chloride and having a boiling point above about 145° C. and below the decomposition temperature of polymeric vinylidene chloride, the monomeric vinylidene chloride being the only polymerizable compound present.

2. The process which comprises subjecting monomeric vinylidene chloride to polymerization at a temperature between about room temperature and about 90° C. in the presence of from 50 to 85 parts of a non-polymerizable, water-immiscible, inert liquid for each 50 to 15 parts of monomeric vinylidene chloride, whereby there is produced a gel having a liquefaction temperature of about 143° to 145° C., the said non-polymerizable liquid being miscible with monomeric vinylidene chloride and having a boiling point above about 145° C. and below the decomposition temperature of monomeric vinylidene chloride, the said monomeric vinylidene chloride being the only polymerizable compound present, thereafter heating the so-formed gel to a temperature above its liquefaction temperature, casting a film from the liquefied mixture, and removing the inert liquid from the film.

3. The process which comprises subjecting monomeric vinylidene chloride to polymerization at a temperature between about room temperature and about 90° C. in the presence of from about 50 to 85 parts of ortho-dichlorobenzene by weight for each 50 to 15 parts of monomeric vinylidene chloride, whereby there is produced a gel having a liquefaction temperature of about 143° to 145° C., the monomeric vinylidene chloride being the only polymerizable compound present.

4. The process which comprises subjecting monomeric vinylidene chloride to polymerization at a temperature from about room temperature to about 90° C. in the presence of from about 50 to 85 parts of ortho-dichlorobenzene by weight for each 50 to 15 parts of monomeric vinylidene chloride, whereby there is produced a gel having a liquefaction temperature of about 143° to 145° C., the monomeric vinylidene chloride being the only polymerizable compound present, thereafter casting a film from the so-formed gel and removing ortho-dichlorobenzene from the film.

JOHN H. REILLY.